United States Patent [19]

Sulzer, Jr. et al.

[11] Patent Number: 4,754,846

[45] Date of Patent: Jul. 5, 1988

[54] OIL RESERVOIR ASSEMBLY

[75] Inventors: Robert W. Sulzer, Jr., Casselberry; Donald L. Mills, Deltona, both of Fla.

[73] Assignee: Westinghouse Electric Corp., Pittsburgh, Pa.

[21] Appl. No.: 108,671

[22] Filed: Oct. 15, 1987

[51] Int. Cl.$^4$ ............................ F01M 1/10; F01M 9/10
[52] U.S. Cl. .................................. 184/6.12; 184/6.24; 74/467
[58] Field of Search ..................... 184/6.12, 6.24, 65; 74/467 X

[56] References Cited

U.S. PATENT DOCUMENTS 4,612,818  9/1986  Hori ...................................... 74/467
4,677,871  7/1987  Taniyama ............................. 74/467

FOREIGN PATENT DOCUMENTS 978871  12/1975  Canada ............................. 184/6.12

Primary Examiner—William L. Freeh
Assistant Examiner—Jane E. Obee

[57] ABSTRACT

An oil reservoir assembly for delivering oil through an oil port in a vertical housing wall of a heavy, clumsy, housed mechanism which must be moved into operating position through a restricted access opening. The oil reservoir assembly is attached to the vertical housing wall in oil delivering disposition relative to the oil port. During positioning of the mechanism the reservoir assembly becomes operably associated with the distal end of an oil supply line. The assembly comprises a casing having a wall with a hole therethrough. The casing defines an oil reservoir chamber and is connected to the vertical wall of the mechanism with the oil reservoir chamber in fluid communication with the oil port. A frusto-conically shaped guidance member is mounted within the chamber in alignment with the hole. The guidance member has an internal, conically shaped surface and an inlet at one end of the conically shaped surface which is larger than the oil supply line and a relatively smaller outlet at the opposite end of the surface. The hole in the casing and the inlet and outlet of the guidance member are disposed in general alignment with the oil supply line during positioning of the mechanism whereby the conically shaped internal surface of the guidance member is in position to contact the distal end of the oil line during positioning of the mechanism and guide the distal end of the oil line through the outlet and into its correct operating disposition inside the chamber.

7 Claims, 3 Drawing Sheets

OIL RESERVOIR ASSEMBLY

BACKGROUND OF THE INVENTION

FIELD OF THE INVENTION

This invention relates to reservoirs for supplying oil to large industrial mechanisms and in particular relates to such assemblies which must be connected to oil supply lines in mechanisms which do not provide ready access to the oil supply line. In particular, the invention relates to an oil reservoir assembly which facilitates connection of the assembly to and disconnection of the assembly from a hard to reach oil supply lines during the installation and removal of heavy, clumsy, housed mechanisms such as the turning gear assemblies used in connection with steam turbines.

Steam turbines include large rotors which are difficult to rotate from an at rest position due to their large mass. Moreover, during start up and shut down of the turbine, it is desirable to slowly turn the rotor to minimize temperature differentials. Devices known as turning gears are conventionally provided to facilitate the initiation of the rotary motion of the rotor and to rotate the rotor slowly during heat up and cool down.

Conventional turning gear assemblies are heavy, clumsy, housed mechanisms which must be lubricated during operation and which are conventionally mounted for removal and reinstallation. The turning gear assemblies are generally mounted in rather cramped quarters requiring a certain amount of manipulation for installation purposes. Access is limited because the place where the turning gear assembly performs its function is subject to a hostile environment which must be contained. Because of this it is often extremely difficult to connect the oil supply line to the turning gear assembly in an operational condition.

SUMMARY OF THE INVENTION

The prior art difficulties outlined above are addressed by the present invention which provides an oil reservoir assembly including a cone shape guidance member positioned for contacting the distal end of an oil line during installation and positioning of the turning gear assembly. The conically shaped member captures and centers the oil supply line during movement of the turning gear assembly. In particular the prior art problems are alleviated through the provision of an oil reservoir assembly adapted to be mounted on delivering oil through an oil port vertical housing wall of a heavy, clumsy, housed mechanism, such as a turning gear assembly for a steam turbine for delivering oil through an oil port in the wall, which mechanism must be moved into operating position through a restricted access opening with the reservoir assembly attached to said vertical housing wall in oil delivering disposition relative to said port and under conditions such that the reservoir becomes operably associated with the distal end of an oil supply line during positioning of the mechanism. The oil reservoir assembly comprises a casing having a wall with a hole therethrough. The casing defines an oil reservoir chamber and is adapted for connection to the vertical housing wall with the oil reservoir chamber in fluid communication with the oil port. An elongated, frusto-conically shaped guidance member is mounted in the chamber. The guidance member defines a longitudinally extending, internal, conically shaped surface and has an inlet at one end of the surface that is larger than the supply line, and a relatively smaller outlet at the opposite end of the surface. The guidance member is mounted inside the chamber on the casing wall with the inlet of the guidance member disposed in alignment with the hole in the casing wall. The hole in the casing and the inlet of the guidance member are disposed in general alignment with the oil supply line during positioning of the mechanism whereby the conically shaped internal surface of the guidance member is positioned to contact the distal end of the oil line during said positioning and to guide said distal end of the oil line into its correct operating disposition inside the chamber. The reservoir assembly may be provided with an elongated, conical screen element mounted in surrounding relationship to the guidance member, and the guidance member and the screen element may be detachably connected to the casing wall.

In another important aspect, the invention provides an oil reservoir assembly adapted for operable connection to an oil supply line having a projecting distal end, in oil receiving relationship to said distal end. The assembly comprises a casing defining an oil reservoir chamber and having a wall with a hole therethrough. The assembly also includes an elongated frusto-conically shaped guidance member defining a longitudinally extending internal, conically shaped surface. The guidance member has an inlet at one end of the surface and a relatively smaller outlet at the opposite end of the surface, and is mounted on said wall to extend inside the chamber with the inlet disposed in alignment with the hole. As a result of such structure, the assembly may be moved toward the distal end of the oil supply line, in a direction longitudinally of the oil line, with the hole facing the end of the line and with the inner surface of the guidance member positioned to contact the distal end of the oil line and guide it through the outlet and into its correct operating disposition in the chamber.

DESCRIPTION OF THE PREFERRED EMBODIMENTS

Figure 1:
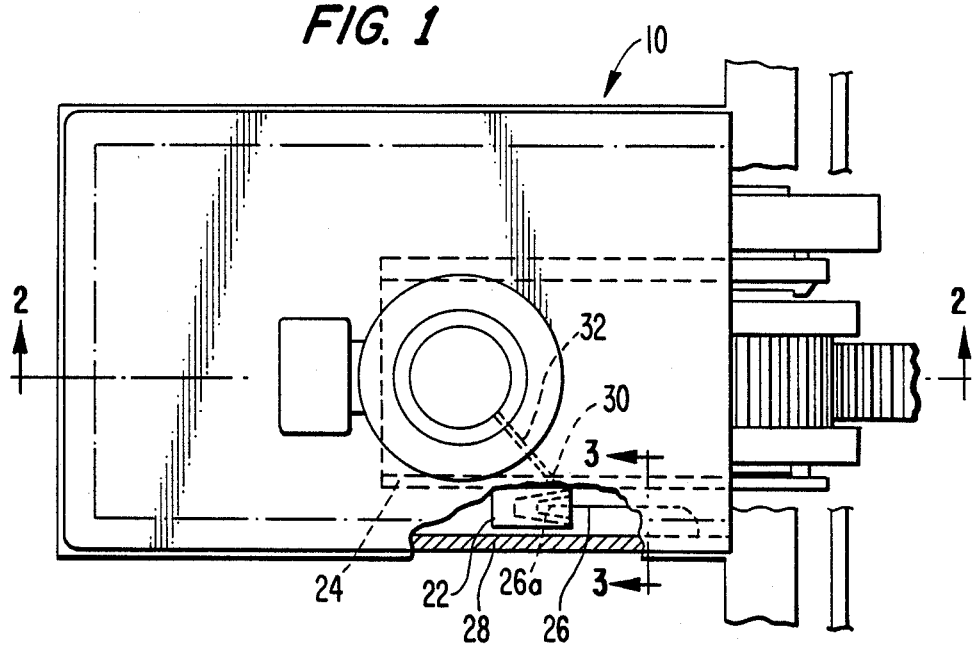
FIG. 1 is a schematic top plan view of a turning gear mechanism mounted on a mounting pedestal of a steam turbine.

FIG. 1 is a top plan view of a turning gear mechanism 10 for a steam turbine (not shown). Mechanism 10 is a heavy, clumsy, housed mechanism which is designed to be mounted on the pedestal 12 of a steam turbine (not shown). Assembly 10 includes a gear train designated broadly by the reference numerals 14, driven by an electric motor 16. Gear train 14 includes a gear 18 positioned for engagement with a large gear 20 on the periphery of a flywheel connected coaxially with the turbine rotor for rotation therewith. Accordingly, turning gear assembly 10 is operable to rotate gear 20 and thus the steam turbine rotor for initial start up of the rotor and during heat up and cool down.

As can be seen viewing FIG. 1, an oil reservoir assembly 22 is mounted on a vertical housing wall 24 of assembly 10. During normal operation, assembly 22 is disposed in fluid communication with an oil supply line 26 which is secured to a wall 28 of pedestal 12. A port 30 is provided in wall 24 and an oil line 32 extends from port 30 to direct a flow of oil toward the central portions of a bearing 34 (see FIG. 2) which mounts the shaft of a worm gear 36 of gear train 14.

Figure 3:
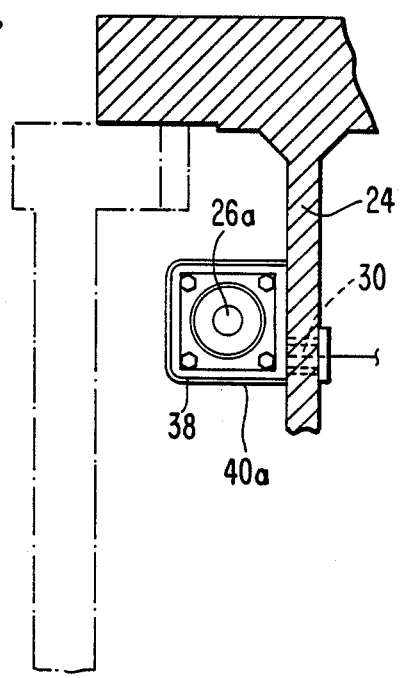
FIG. 3 is an enlarged cross-sectional view taken essentially along the line 3—3 of FIG. 1 and illustrating the oil reservoir assembly of the invention mounted in oil dispensing disposition relative to an oil port in a vertical housing of the turning mechanism.
Figure 4:
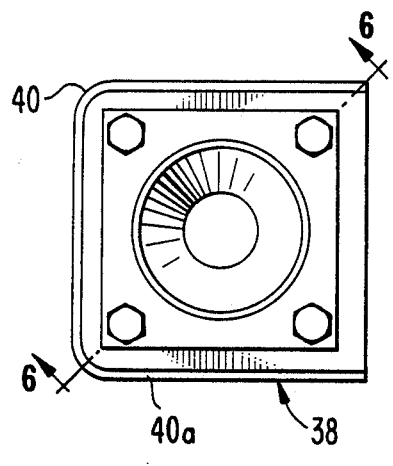
FIG. 4 is an enlarged horizontal end view of the oil reservoir assembly of FIG. 3.
Figure 5:
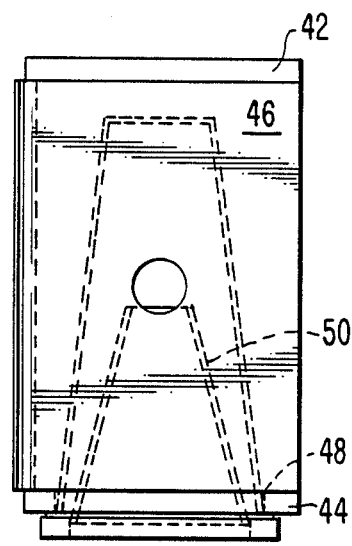
FIG. 5 is a top plan view of the assembly of FIG. 4.
Figure 6:
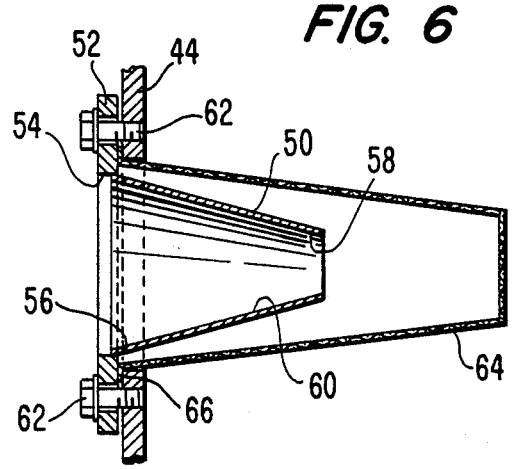
FIG. 6 is a cross-sectional view taken essentially along the lines 6—6 of FIG. 4.

With reference to FIGS. 4, 5 and 6, it can be seen that assembly 22 comprises a casing 38 made up of a U-shaped central portion 40 and end walls 42 and 44. Casing 38 defines an oil reservoir chamber 46. As shown in FIGS. 4 and 5, the right hand side of the casing 38 is open and with reference to FIG. 3 it can be seen that casing 38 is mounted on wall 24 by welding or the like with the open side of chamber 46 disposed in fluid communication with port 30. Thus, oil from chamber 46 will be able to flow by gravity through port 30 and line 32 to provide lubricating oil for the turning gear assembly.

Wall 44 of casing 38 is provided with a central opening or hole 48. An elongated frusto-conically shaped guidance member 50 is positioned to extend through hole 48 and into chamber 46, as can best be seen viewing FIG. 5. Guidance member 50 is carried by a plate 52 which has a circular opening 54 disposed at its center. Member 50 has an inlet 56 at one end thereof and an outlet 58 at its other end, and as can be seen viewing FIG. 6, inlet 56 is larger than outlet 58 due to the conical configuration of member 50. Also due to the conical configuration of member 50, the same presents an internal, outwardly facing, conically shaped surface 60. The end of member 50 adjacent inlet 56 is attached by welding or the like to the internal periphery of hole 54 and plate 52 is attached to wall 44 by screws 62 with inlet 56 disposed in alignment with hole 48 in wall 44.

An elongated conical screen element 64 is also disposed in chamber 46 in surrounding relationship to member 50. Element 64 also projects through hole 48 as can be seen viewing FIG. 6 and the same is provided with an annular flange 66 disposed between plate 52 and wall 44. During assembly, element 64 is simply inserted through hole 48 and then plate 52 is tightened using screws 62 so as to firmly secure the flange 66 between plate 52 and wall 44. Accordingly, both the member 50 and the screen element 64 are detachably connected to casing 38.

Figure 2:
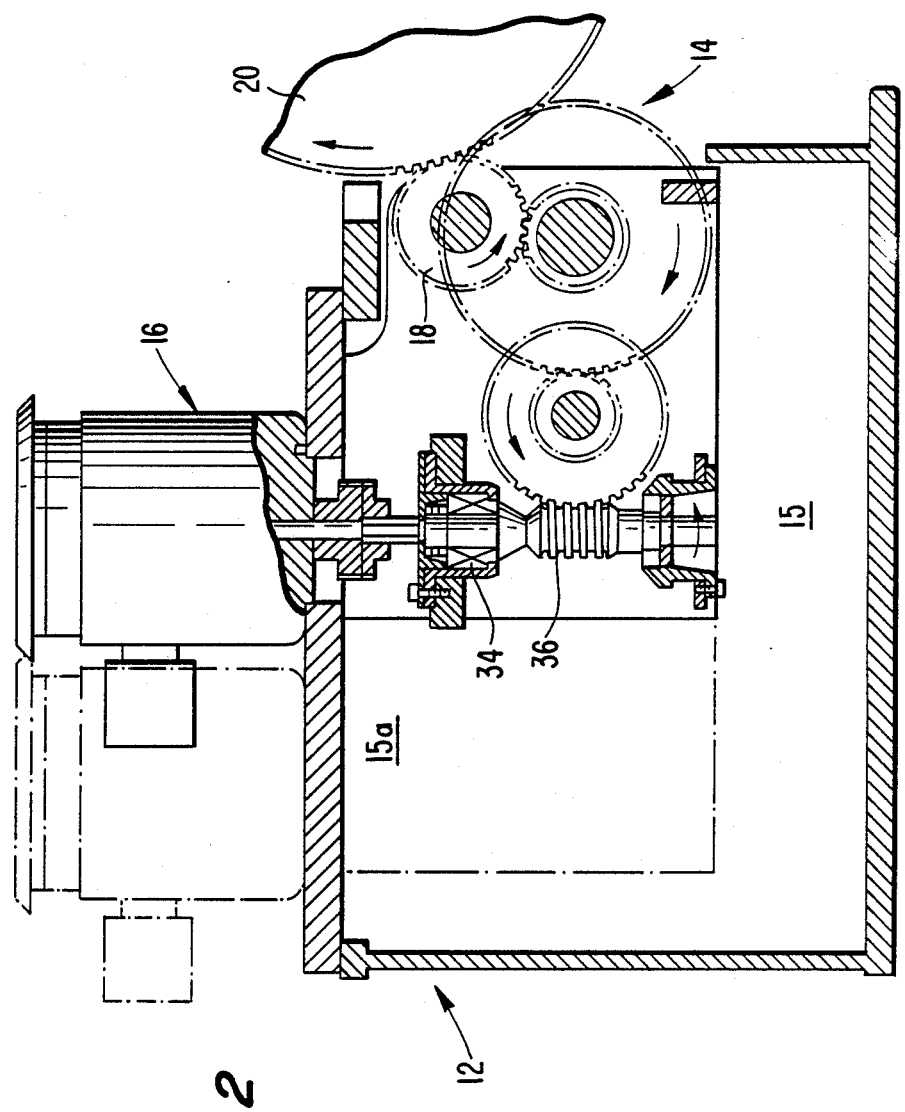
FIG. 2 is a schematic elevational cross-sectional view taken along the line 2—2 of FIG. 1.

During mounting of turning gear assembly 10 onto pedestal 12 with the turning gear assembly 14 disposed within chamber 15, the entire gear train 14 must be moved vertically through the restricted access opening 15a (see FIG. 2). During this vertical movement the turning gear assembly 10 will assume the position illustrated schematically by dashed lines in FIG. 2. After reaching the proper vertical position with the gear train 14 disposed within chamber 15, the entire assembly 10 must be shifted to the right in FIG. 2 and into the position shown in solid lines. During such horizontal shifting, oil reservoir assembly 22 moves rightwardly to the position indicated in FIG. 1. During the shifting of oil reservoir assembly 22, the conically shaped surface 60 of member 50 encounters the distal end 26a of oil line 26 and eventually upon continued movement of assembly 22 to the right the distal end 26a is guided by the conical shape of surface 60 until it projects through outlet 58 and into chamber 46 of oil reservoir casing 38. In this regard it is to be noted that it is not always possible to pin point the exact placement for distal end 26a of oil line 26 and during the movement of the oil reservoir assembly 22 to the right, the distal end 26a moves through opening 56 of member 50 and if it is not precisely aligned with outlet 58, the distal end 26a of the oil line will contact the internal conically shaped surface 60 and open continued movement surface 60 will guide end 26a through outlet 58 without damaging the oil line.

Oil directed from line 26 through distal end 26a will be screened by surrounding screen 64 before dropping onto the lower wall 40a of casing 40. As can be seen viewing FIG. 3, chamber 46 is in fluid communication with oil port 30 and thus oil accumulating on floor 40a of casing 38 will be able to flow through port 30 and along line 32 for delivery to the turning gear assembly mechanism.

Although the foregoing description describes horizontal movement of the turning gear assembly after the same has been lowered vertically, this movement depends upon the overall design of the pedestal and the turbine structure. In some instances, the movement will all be in a vertical direction and in such an instance, the oil line would be positioned to extend vertically upwardly and the oil reservoir assembly could be turned 90° with the guidance surface 60 facing downwardly. Thus, the oil reservoir would move vertically toward the end of the oil supply line and the end of the oil line would be guided into the chamber with all movement of the reservoir being in a vertical direction.

We claim:

1. An oil reservoir assembly adapted for operable connection to an oil supply line having a projecting distal end with the assembly in oil receiving relationship relative to said end, said assembly comprising:

a casing defining an oil reservoir chamber and having a wall with a hole therethrough; and an elongated frusto-conically shaped guidance member defining an internal, longitudinally extending, conically shaped surface and having an inlet at one end of the surface and a relatively smaller outlet at the opposite end of the surface, said member being mounted inside said chamber on said wall with said inlet disposed in alignment with said hole, whereby said assembly may be moved toward said distal end, longitudinally of said oil line with said hole facing toward said end of the line and with said inner surface of the guidance member positioned to contact the distal end of the oil line and guide it through the outlet and into its correct operating disposition in the chamber.

2. An assembly as set forth in claim 1 wherein is included an elongated, conical screen element mounted in said casing in surrounding relationship to said guidance member.

3. An assembly as set forth in claim 2 wherein said guidance member and said screen element are detachably connected to said casing wall.

4. An oil reservoir assembly for delivering oil through an oil port in a vertical housing wall of a heavy, clumsy, housed mechanism which must be moved into operating position through a restricted access opening with the reservoir assembly attached to said vertical housing wall in oil delivering disposition relative to said port and under conditions such that the reservoir assembly becomes operably associated with the distal end of an oil supply line during positioning of the mechanism, said assembly comprising:

a casing having a wall with a hole therethrough, said casing defining an oil reservoir chamber and being adapted for connection to said vertical wall with the chamber in fluid communication with said port; and an elongated, frusto-conically shaped guidance member defining an internal, longitudinally extending, conically shaped surface and having an inlet at one end of the conically shaped surface that is larger than said supply line and a relatively smaller outlet at the opposite end of the surface, said guidance member being mounted inside said chamber on said casing wall with said inlet disposed in alignment with said hole, said hole in the casing and said inlet of the guidance member being disposed to be in general alignment with said oil supply line during positioning of the mechanism whereby the conically shaped internal surface of the guidance member is positioned to contact said distal end of the oil line during said positioning and guide it through said outlet and into its correct operating disposition inside the chamber.

5. An assembly as set forth in claim 4 wherein said mechanism comprises a turning gear assembly for a steam turbine.

6. An assembly as set forth in claim 4 wherein is included an elongated, conical screen element mounted in said chamber in surrounding relationship to said guidance member.

7. An assembly as set forth in claim 6 wherein said guidance member and said screen element are detachably connected to said casing wall.

* * * * *